Dec. 2, 1958     C. D. FLANAGAN     2,863,025

THERMOSTATS

Filed May 3, 1957

Charles D. Flanagan,
Inventor.
Koenig and Pope,
Attorneys.

United States Patent Office 2,863,025
Patented Dec. 2, 1958

2,863,025

THERMOSTATS

Charles D. Flanagan, Attleboro, Mass., assignor to Metals & Controls Corporation, Attleboro, Mass., a corporation of Massachusetts Application May 3, 1957, Serial No. 656,868

10 Claims. (Cl. 200—138)

This invention relates to thermostats, and more particularly to composite or bimetallic thermostat materials and thermostatic elements.

Among the several objects of the invention may be noted the provision of a novel construction for composite or bimetallic thermostat materials and thermostatic elements made therefrom, which construction makes it possible to attain higher electrical resistance or higher expansion than heretofore possible by the use of conventional metals for the high and low expansion components of the composite material, and which eliminates any necessity for taking into consideration the properties of such metal during rolling, forming or the like operations, as is necessary with present conventional composite thermostat manufacture; and the provision of such constructions which are economical to manufacture. The invention is based on my discovery that it is possible to bond together a layer of a relatively high expansion metal and a layer of a relatively low expansion metal by means of a bonding layer of a high-temperature, high-strength adhesive to attain composite material which exhibits satisfactory thermostatic action, as distinguished from the conventional mode of bonding the metal layers directly together by soldering, welding, rolling or forming operations. The term "metal" as used herein includes alloys. In the case wherein the composite material is to be used as a current-carrying element, and high electrical resistance of the element is desired, a metal having high electrical resistance is used as one of the metals, and the adhesive is such as to provide high electrical insulation between the layers, whereby flow of current is confined to the high-resistance metal layer. Other objects and features will be in part apparent and in part pointed out hereinafter.

The invention accordingly comprises the constructions and methods hereinafter described, the scope of the invention being indicated in the following claims.

Figure 1:
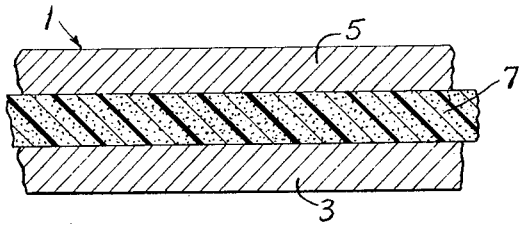
Figure 2:
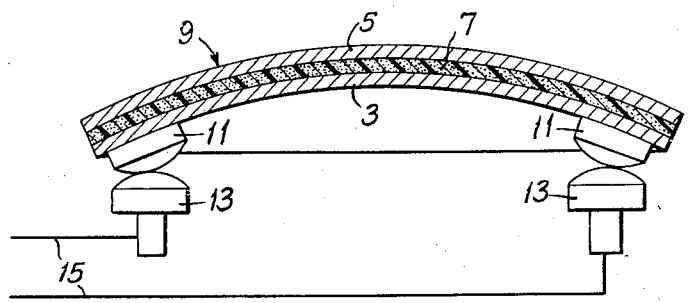
Figure 3:
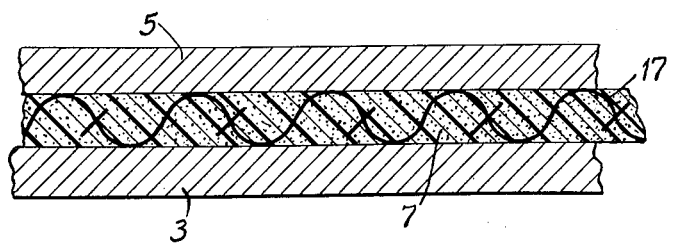

In the accompanying drawings, in which several of various possible embodiments of the invention are illustrated, Fig. 1 is a cross section, with thicknesses exaggerated, of a first type of composite sheet thermostat material of this invention;

Fig. 2 is a cross section showing a current-carrying snap-acting thermostatic disk element made from material such as illustrated in Fig. 1, also showing circuit connections for the disk element; and, Fig. 3 is a cross section similar to Fig. 1 showing a modification.

Corresponding reference characters indicate corresponding parts throughout the several views of the drawings.

Referring to the drawings, Fig. 1 shows a composite thermostat material 1 of this invention consisting of a layer 3 of a relatively high expansion metal or alloy and a layer 5 of a relatively low expansion metal or alloy, bonded together by a layer 7 of a nonmetallic high-temperature, high-strength adhesive between the metals. Layers 3 and 5 may be any of the metals conventionally used in manufacturing bimetals or special ones. For example, layer 3 may be an alloy consisting by weight of 22% Ni, 3% Cr and 75% Fe, and layer 5 may be Invar.

A physical requirement for the adhesive in layer 7 is that it shall be electrically nonconductive. At working temperature it shall have a sufficiently low modulus of elasticity to be able to flex without cracking upon thermostatic flexing of the composite material but high enough to render the materials joined thereby sufficiently active thermostatically when heated. The material shall also have a sufficiently strong bond to each of the metals and sufficient shear strength to resist differential expansion of the inner faces of the metal layers. By "working temperature" is meant the working temperature of a thermostatic element (such as a snap-acting disk) made from the composite material. One adhesive that may be used is a heat-curable epoxy resin sold under the trade designation "Stycast 2662" by Emerson and Cuming, Inc. This base resin may be provided with up to 25 parts by weight of additional slate flour filler, which is electrically nonconductive. The addition to the base resin of 25 parts by weight of an anhydride curing agent, sold under the trade designation "Catalyst No. 14" by said company, and heat will effect curing. There are also other so-called modified epoxy and phenolic nonconductive resins known to those in the resin art which may be used for the purpose. Other electrically nonconductive fillers may be used, such as glass or asbestos fibres and the like.

The composite material is made by cleaning the alloy layers of oxides, as by conventional pickling or in any other suitable manner, applying a thin coat of the uncured resin to each alloy layer, semicuring the resin as by heating to a semihard condition, then pressing the layers together and simultaneously completely curing as by heating.

The completely cured epoxy base resin layer 7 electrically insulates layer 5 from layer 3. The slate flour, glass or asbestos fibre filler in the resin accomplishes the dual function of preventing complete squeeze-out of the resin from any local areas between the layers during the pressing together of the layers, and increasing the shear strength and modulus of elasticity of the resin. Also, the thermal coefficient of expansion and heat conductivity characteristics of the adhesive may be improved by inclusion of such fillers.

One of the metal layers of the composite material (usually the high expansion layer) may be a high electrical resistance alloy. An alloy consisting of 3% molybdenum, 15% aluminum and 82% electrolytic iron is such a high electrical resistance alloy. The invention is particularly advantageous in the case of this alloy because it is ordinarily quite difficult to bond to other materials by conventional methods whereas this is not the case by use of my resin bonding material. Thus the layer of adhesive not only insulates the alloy layers one from the other but constitutes an improved bonding agent.

The following example illustrates the invention: I bonded a strip of an alloy consisting by weight of 22% Ni, 3% Cr and 75% Fe to a strip of Invar by means of a layer of the first above-mentioned slate-flour-filled adhesive according to the above-described method. Each strip was approximately 0.225 inch wide and 1.5 inches long. The Invar strip was .006 inch thick, the other strip was .006 inch thick, and the adhesive layers was .008 inch thick, making the over-all thickness of the composite strip 0.020 inch. The initial curing was at 100° C. for three hours. The final curing was under moderate pressure at 150° C. for twelve hours. The resultant composite strip was tested up to 350° F. and exhibited satisfactory deflection on heating. It had relatively high (greater than ten megohms) insulation resistance between the metal layers.

Thermostatic sheet material such as above described may be made into any desired form of thermostatic element, for example the dished snap-acting disk 9 illustrated in Fig. 2, having contacts 11 welded to the metal layer 3. It will be understood that such a disk is used in conjunction with fixed contacts 13 connected in an electrical circuit as indicated at 15. The disk normally is dished as shown in solid lines in Fig. 2 for engagement of contacts 11 with contacts 13. Under these circumstances, current flows through the metal layer 3 of the disk. Since layer 7 provides high insulation resistance, flow of current is confined to metal layer 3, as distinguished from the conventional bimetal in which current flows through both layers. Accordingly, the over-all resistivity of the element is that of the metal layer 3 alone and is, therefore, higher than the resistivity of the conventional bimetal in which the effective resistance of one layer is lowered by the shunting action of the other metal layer.

Fig. 3 illustrates a modification wherein a nonconductive temperature-resistant fabric layer 17 is provided between the metal layers 3 and 5, the adhesive 7 in this case filling the interstices of the fabric. The fabric may be one woven of glass, quartz or asbestos fibres. In this case, it is not necessary to use any filler such as slate flour, glass or asbestos fibres in the adhesive. The fabric effectively prevents squeeze-out of the resin from between the metal layers during the pressing together of the layers, and increases the shear strength and modulus of elasticity of the resin. When the fabric layer is used, it is possible to omit the initial semicuring of the resin to a semihard condition since it may be pressed and completely cured in a single step.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. Composite thermostat material comprising a layer of a relatively high expansion metal and a layer of a relatively low expansion metal bonded together by an intermediate flexible layer of a high-temperature high-strength metal-to-metal adhesive, the bond between said adhesive layer and the metal layers and the shear strength of the adhesive layer being such as to resist differential expansion of the bonded-together faces of the metal layers.

2. Composite thermostat material as set forth in claim 1 wherein the adhesive is an epoxy resin base adhesive.

3. Composite thermostat material as set forth in claim 1 wherein one metal layer is a relatively high electrical resistance layer and the adhesive layer is an electrical insulator between the metal layers.

4. Composite thermostat material as set forth in claim 3 wherein the adhesive is an epoxy resin base adhesive.

5. Composite thermostat material as set forth in claim 1 wherein the adhesive contains an inert filler of electrical insulating material.

6. Composite thermostat material as set forth in claim 5 wherein the adhesive is an epoxy resin base adhesive.

7. Composite thermostat material as set forth in claim 1 wherein there is a temperature-resistant fabric layer between the metal layers, the adhesive being contained in the interstices of the fabric.

8. Composite thermostat material as set forth in claim 7 wherein the adhesive is an epoxy resin base adhesive.

9. The method of making composite thermostat material comprising cleaning a surface of a layer of a relatively high expansion metal of oxide and cleaning a surface of a layer of a relatively low expansion metal of oxide, applying a coating of an uncured heat-curable high temperature metal-to-metal adhesive to each cleaned surface, heating the coated layers partially to cure the adhesive, then pressing the layers together with the adhesive between the layers and heating to complete the curing of the adhesive.

10. The method of making a composite thermostat material comprising cleaning a surface of a layer of relatively high expansion metal of oxide and cleaning a surface of a layer of relatively low expansion metal of oxide, applying a coating of an uncured high temperature metal-to-metal thermosetting resin adhesive to at least one of said cleaned surfaces, heating the coated layer partially to cure the resin adhesive, then pressing the layers together with the partially cured resin adhesive therebetween, and thereafter heating the resulting assembly to complete the curing of the resin adhesive.

References Cited in the file of this patent

UNITED STATES PATENTS

| | | |
|---|---|---|
| 1,289,617 | Berry | Dec. 31, 1918 |
| 1,511,352 | Miller | Oct. 14, 1924 |
| 1,924,647 | McGregor | Aug. 29, 1933 |
| 2,573,686 | Blinn et al. | Nov. 6, 1951 |